(12) United States Patent
Hernandez

(10) Patent No.: US 7,618,308 B1
(45) Date of Patent: Nov. 17, 2009

(54) POWER OPERATED FISH SCALING APPARATUS

(76) Inventor: Carlos Hernandez, 10270 SW. 50th Ter., Miami, FL (US) 33165

( * ) Notice: Subject to any disclaimer, the term of this patent is extended or adjusted under 35 U.S.C. 154(b) by 0 days.

(21) Appl. No.: 12/329,053

(22) Filed: Dec. 5, 2008

Related U.S. Application Data

(60) Provisional application No. 61/023,612, filed on Jan. 25, 2008.

(51) Int. Cl.
*A22C 25/02* (2006.01)
(52) U.S. Cl. ........................................................ 452/99
(58) Field of Classification Search .................. 452/1, 452/2, 5, 6, 102–105, 98, 99, 101
See application file for complete search history.

(56) References Cited

U.S. PATENT DOCUMENTS

| | | | | |
|---|---|---|---|---|
| 3,072,956 A | * | 1/1963 | Olrich | 452/101 |
| 3,328,834 A | * | 7/1967 | Pulcifer | 452/101 |
| 4,107,819 A | * | 8/1978 | Saizon | 452/101 |
| 4,619,019 A | * | 10/1986 | Hardy | 452/101 |
| 4,667,372 A | * | 5/1987 | Till | 452/101 |
| 5,221,229 A | * | 6/1993 | Brophy | 452/105 |
| 5,230,652 A | * | 7/1993 | Alam | 452/98 |
| 5,318,472 A | * | 6/1994 | Johnson | 452/99 |
| 5,630,750 A | * | 5/1997 | Byrd | 452/101 |
| 6,497,615 B1 | * | 12/2002 | Klager | 452/101 |

\* cited by examiner

*Primary Examiner*—Thomas Price
(74) *Attorney, Agent, or Firm*—Gold & Rizvi, P.A.; H. John Rizvi; Glenn E. Gold

(57) ABSTRACT

A fish scale removal apparatus (100) utilizes a rotary motor, which is encased in a cylindrical housing and rotates a blade coupling member (104). The apparatus (100) is designed to rotate at a speed of 1,500-2,500 RPMs. A scale removing blade assembly (120, 150) having a shaft (122, 152) and a plurality of planar blades (124, 154) is assembled to the apparatus (100) by inserting a coupling end (126) of the shaft into the blade coupling member (104). The planar blades (124, 154) have a width (W) that is substantially greater than the thickness (T) allowing the blade to flex.

20 Claims, 11 Drawing Sheets

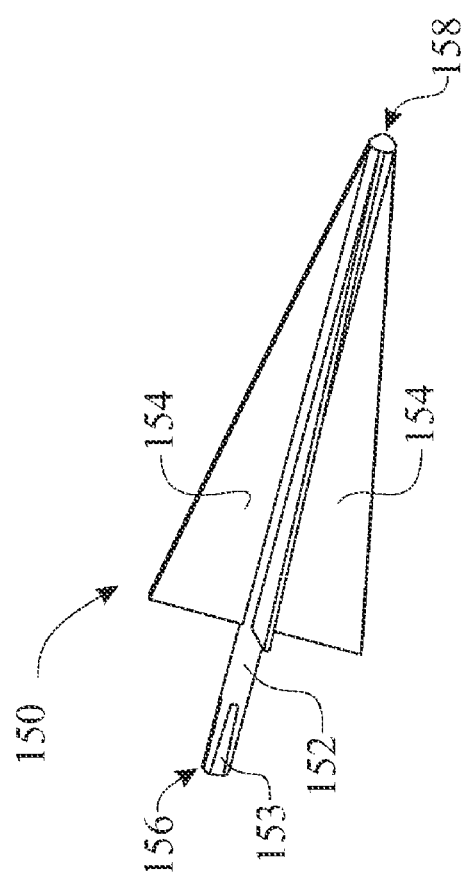
FIG. 10
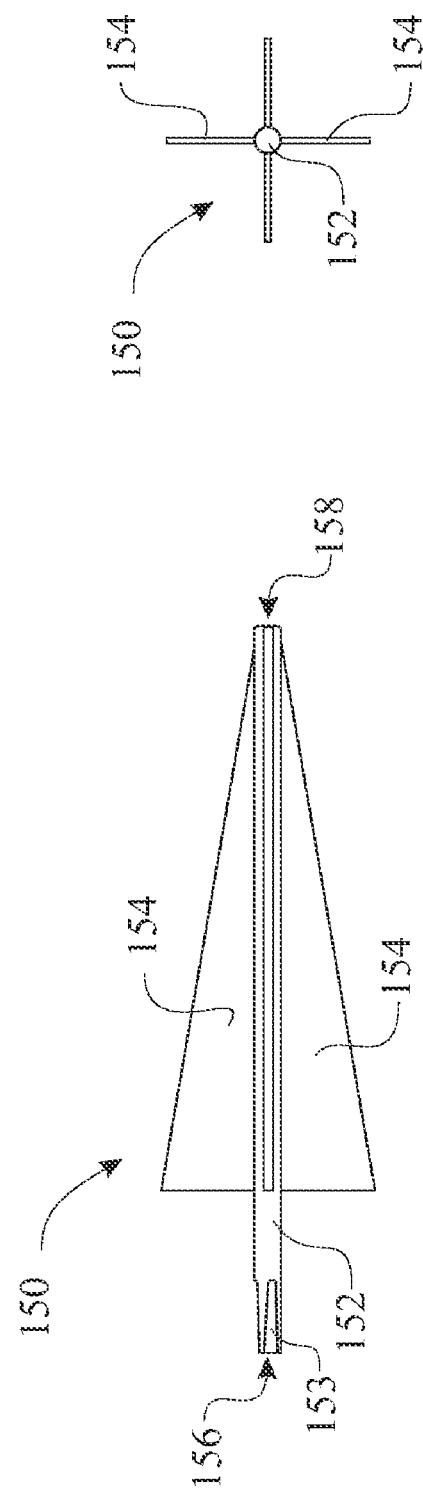
FIG. 11
FIG. 12

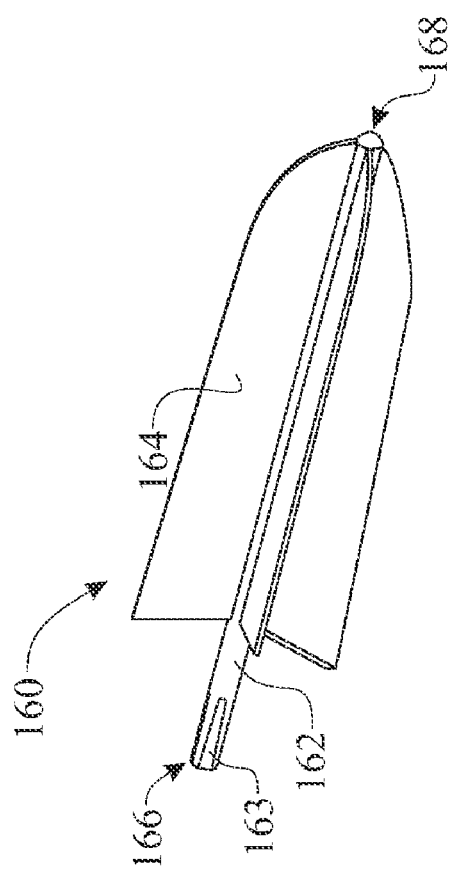
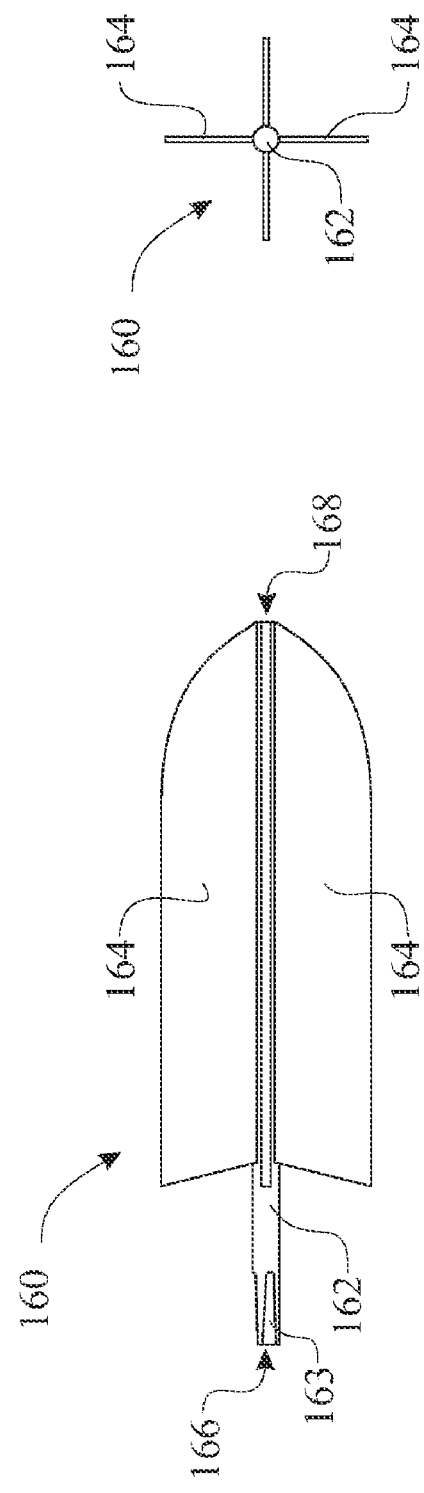
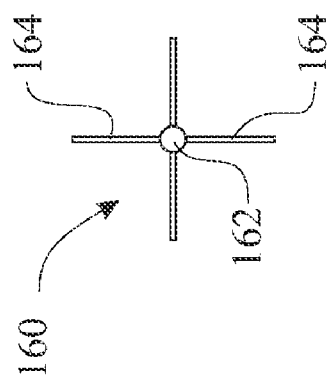

POWER OPERATED FISH SCALING APPARATUS

CROSS-REFERENCE TO RELATED APPLICATION

This Non-Provisional Utility application claims the benefit of co-pending U.S. Provisional Patent Application Ser. No. 61/023,612, filed on Jan. 25, 2008, which is incorporated herein in its entirety.

BACKGROUND OF THE INVENTION

1. Field of the Invention

The present invention relates to fish scalers. More specifically, it relates to an improved powered fish scaler having a higher RPM and a linear and continuously contacting edged blade.

2. Discussion of the Related Art

A number of powered fish scaler devices used in removing scales from scaly fish is known. The known fish scaler devices comprise a rotating scaling member; the scaling member having a textured, non-linear contacting edge.

One example is presented via Colburn, et al. (U.S. Pat. No. 2,835,919) that teaches a rotor (5) having a plurality of rings disposed about the rotating axis of the scaling member. The plurality of rings is short, projecting only a small distance from the shaft. This provides a rigid edge for scaling.

Another example is presented via the Super Fish Scaler offered by I. Johnson Enterprises via www.superfishscaler.com. The super fish scaler teaches a plurality of fingers projecting from the rotating axis of the scaling member. The device rotates at 800 RPM. Like Colburn, the scaling edge is not linear.

SUMMARY OF THE INVENTION

The present invention is directed to a fish scaling device, the fish scaling device comprising a plurality of flat, planar blades having a linear contacting edge projecting from a shaft. The blade assembly is then coupled to a cylindrical motor via a blade coupling assembly. A scaler blade safety shield is placed about the non-contacting half of the scaling blade assembly.

Ideally, it is desirable to provide a fish scaling device a plurality of flat, planar blades having a linear contacting edge. Each of the blades projects radially from the rotating axis of a shaft of the blade assembly. The blades are fabricated of a rubber like material, providing some pliability as well as friction.

A first aspect of the present invention is an apparatus comprising a rotary motor encased within a cylindrically shaped housing. The apparatus further comprising a blade coupling assembly disposed upon the distal end of the shaft and located at an end of the housing.

Another aspect of the present invention is a fish scaling assembly, the fish scaling assembly comprising a shaft and a plurality of planar blades aligned lengthwise and projecting radially from the axis of the shaft. The blades are spaced evenly to ensure proper balance during rotation.

Yet another aspect provides a scaling blade comprising a chamfered contacting edge.

Yet another aspect provides a scaling blade comprising a curved contacting edge.

Yet another aspect provides a scaling blade having a planar surface shape of a triangle.

Yet another aspect provides a scaling blade having a planar surface shape of a rectangle comprising a rounded distal end.

Yet another aspect provides a scaling blade having a planar surface with a contacting edge being generally parallel to the shaft and turning towards the distal end of the shaft as the contacting edge approaches the distal end.

Yet another aspect provides a sliding power control, wherein the sliding power control governs the speed (RPM) of the motor.

Yet another aspect provides a levered power control, wherein the levered power control governs the speed (RPM) of the motor.

Yet another aspect provides a power source for the rotary motor, the power source being at least one of:

a) an AC power source and respective AC plug;
b) a DC power source and respective DC plug; and
c) a portable power source such as a battery incorporated into a battery holder.

Yet another aspect provides an interchangeable power source by utilizing a variety of power plugs adapted via a common connector style.

These and other features, aspects, and advantages of the invention will be further understood and appreciated by those skilled in the art by reference to the following written specification, claims, and appended drawings.

BRIEF DESCRIPTION OF THE DRAWINGS

For a fuller understanding of the nature of the present invention, reference should be made to the following detailed description taken in conjunction with the accompanying drawings in which:

FIG. 10 presents an isometric view of the fish scaling blade assembly as used FIG. 8;

FIG. 11 presents a side view of the fish scaling blade assembly of FIG. 10;

FIG. 12 presents an end view of the fish scaling blade assembly of FIG. 10;

FIG. 14 presents an isometric view of yet another alternate fish scaling blade assembly;

FIG. 15 presents a side view of the fish scaling blade assembly of FIG. 14;

FIG. 16 presents an end view of the fish scaling blade assembly of FIG. 14; and

Like reference numerals refer to like parts throughout the various views of the drawings.

DETAILED DESCRIPTION OF THE PREFERRED EMBODIMENT

Figure 2:
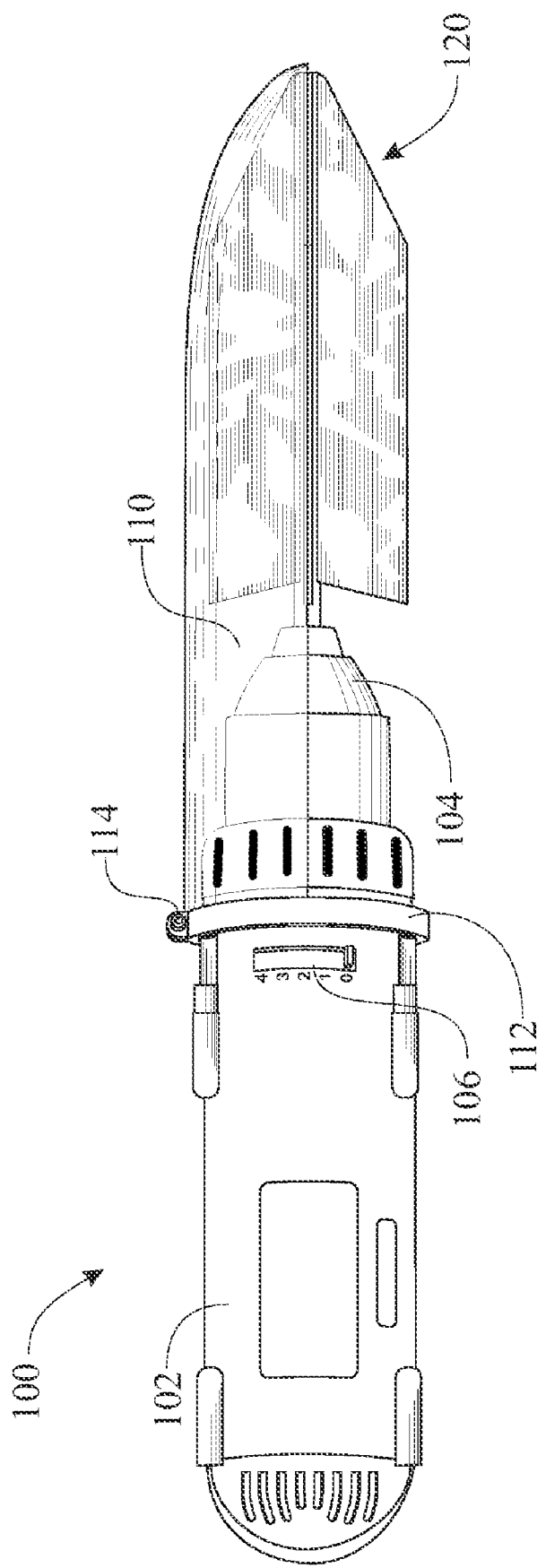
FIG. 2 presents a side view of the fish scaling apparatus as illustrated in FIG. 1, further introducing a scaling blade shield.
Figure 3:
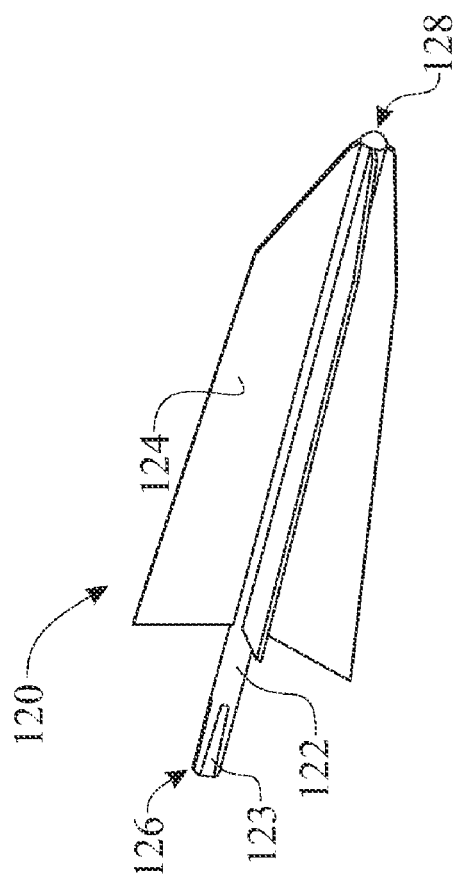
FIG. 3 presents an isometric view of the fish scaling blade assembly as used FIG. 1.
Figure 4:
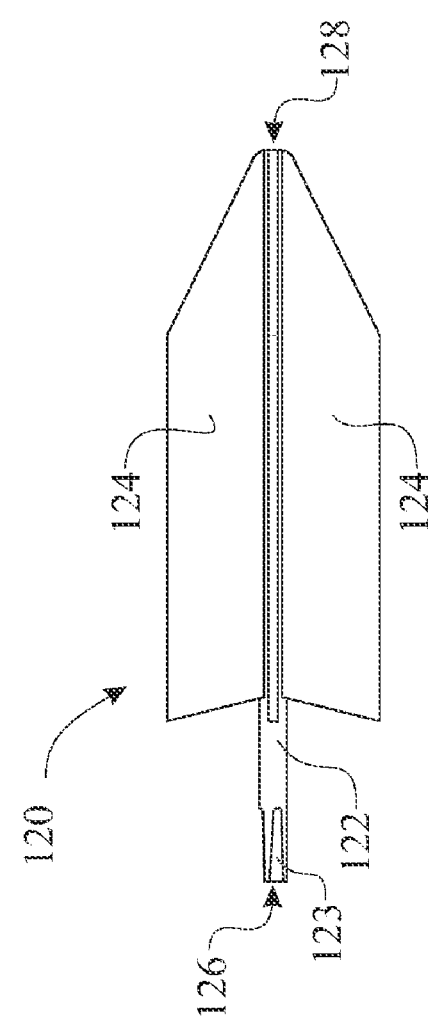
FIG. 4 presents a side view of the fish scaling blade assembly of FIG. 3.
Figure 5:
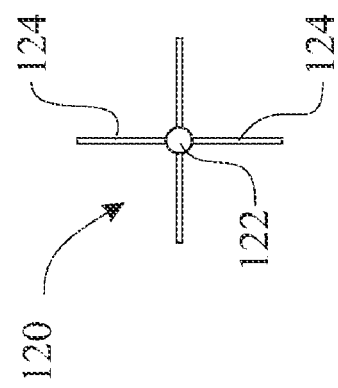
FIG. 5 presents an end view of the fish scaling blade assembly of FIG. 3.

For purposes of description herein, the terms "upper", "lower", "left", "rear", "right", "front", "vertical", "horizontal", and derivatives thereof shall relate to the invention as oriented in FIG. 2. However, one will understand that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
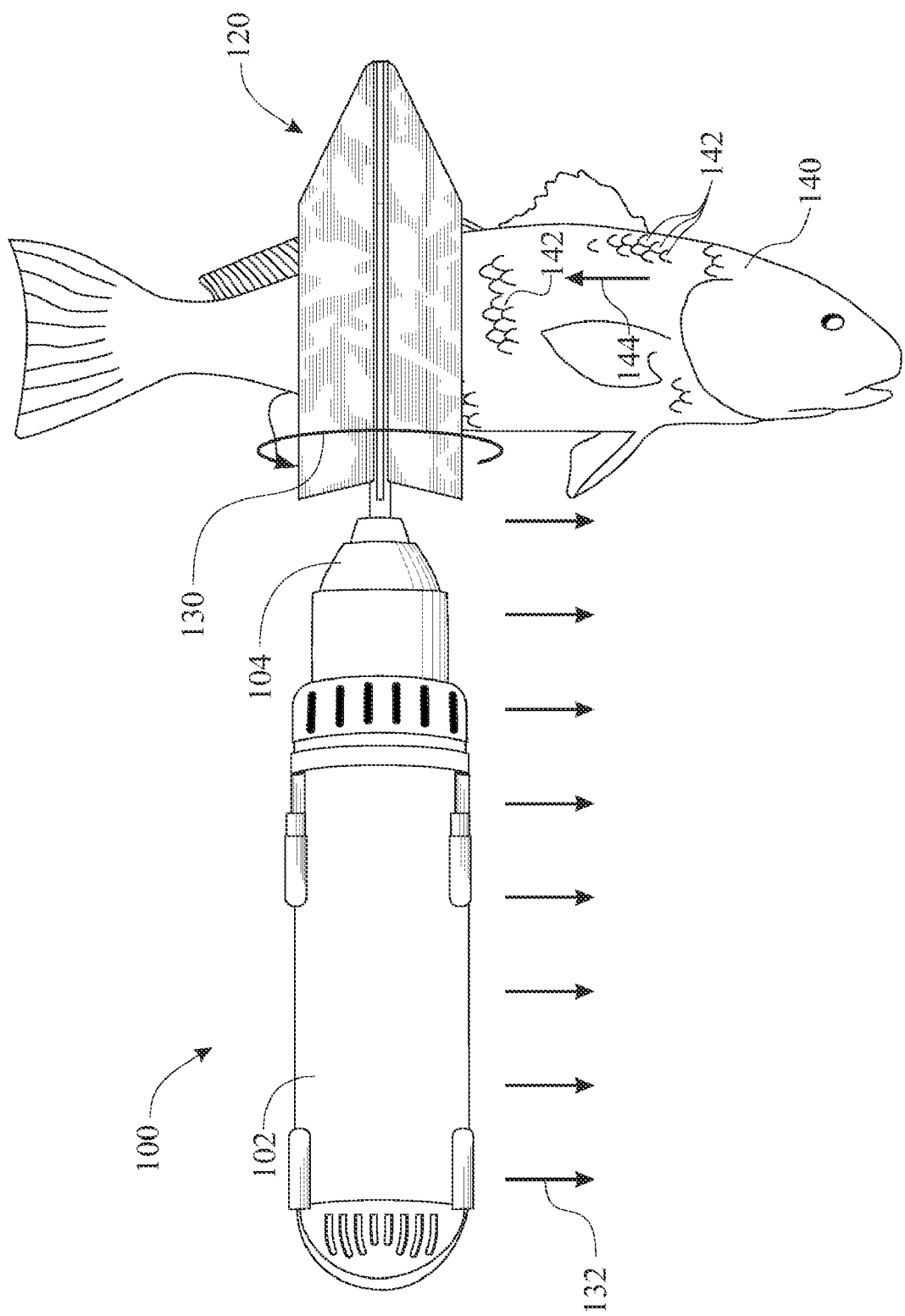
FIG. 1 presents a top view of a fish scaling apparatus illustrated in use.

An exemplary embodiment of a fish scale removing rotary apparatus 100 is presented herein, best presented in FIGS. 1 and 2. The fish scale removing rotary apparatus 100 comprises two (2) primary components, a fish scale removing rotary handpiece 102 and a scale removing blade assembly 120. The fish scale removing rotary handpiece 102 is cylindrical in shape and of a size for one-handed use. The fish scale removing rotary handpiece 102 includes a rotary motor (not shown but well understood) and a power control switch such as a slide power control 106. The slide power control 106 utilizes a sliding switch. The slide control 106 generally includes a variable speed control provided via a detent respective to each optional predetermined speed setting. Another optional power control system can include a separate variable speed controller and an On-Off power switch (both are understood and well known for use on other applications, but not shown). The fish scale removing rotary handpiece 102 incorporates a blade coupling member 104 for removably coupling the scale removing blade assembly 120 to the motor of the fish scale removing rotary handpiece 102. The blade coupling member 104 can be a commonly known key chuck, a keyless chuck (as illustrated), a non-circular quick disconnect design, and the like. A scale removing blade shield 110 is preferably removably assembled to the fish scale removing rotary handpiece 102 providing protection to the user from the blades and any debris such as scales 142. The scale removing blade shield 110 is preferably of a transparent or translucent material and secured to the fish scale removing rotary handpiece 102 via a blade shield coupler 112. The blade shield coupler 112 is essentially a band clamp placed about the circumference of the fish scale removing rotary handpiece 102 and fastened via a shield coupler fastener 114. The exemplary embodiment of the scale removing blade shield 110 provides a protection apparatus about the upper half (non contacting side) of the scale removing blade assembly 120. The fish scale removing rotary apparatus 100 is designed to rotate the blade coupling member 104 at a rate ranging between 1,500 and 2,500 RPMs. The blade coupling member 104 can be coupled either directly or via a plurality of gears to the rotary motor. A scale removing edge 129 (FIG. 6) of the scale removing blade assembly 120 brushes against fish scales 142 of a scaly fish 140, thus removing the fish scales 142 from the scaly fish 140.

The user passes the scale removing blade assembly 120 across the scaly fish 140 via a tool motion 132. The blade rotation 130 and the tool motion 132 are each preferably oriented counter the scale direction 144.

Figure 6:
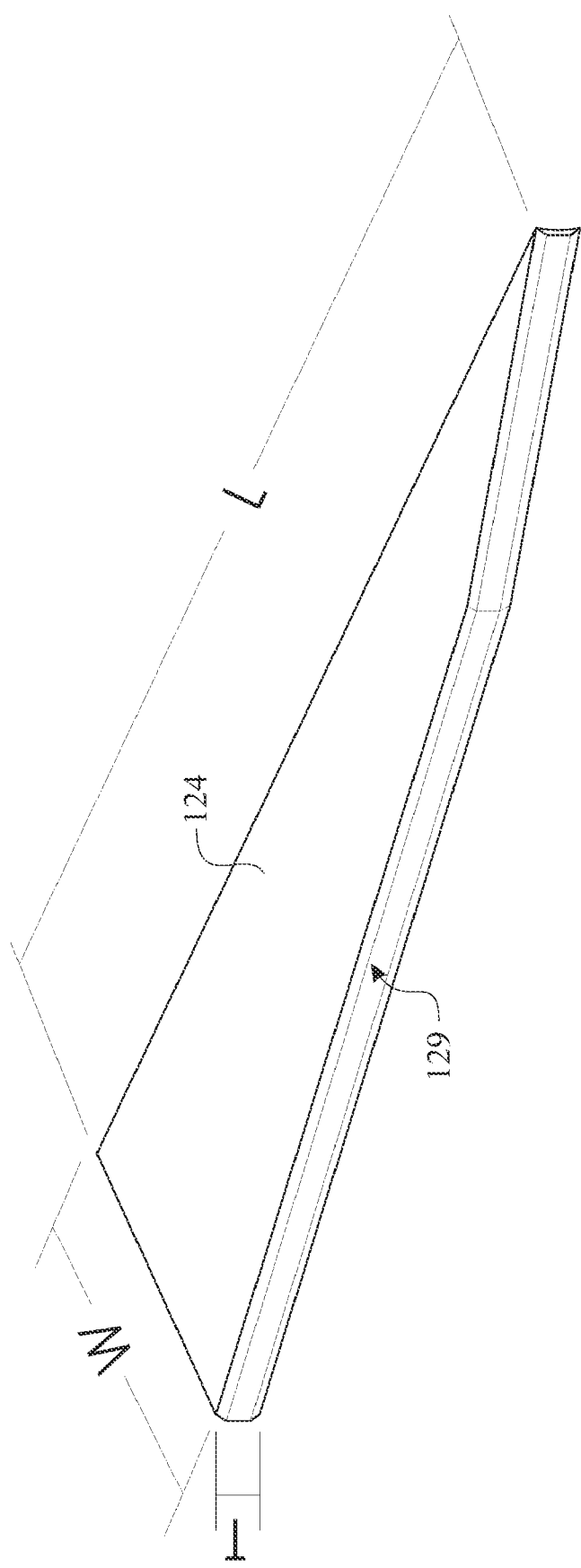
FIG. 6 presents an isometric view of an individual blade of the fish scaling blade assembly of FIG. 3.
Figure 7:
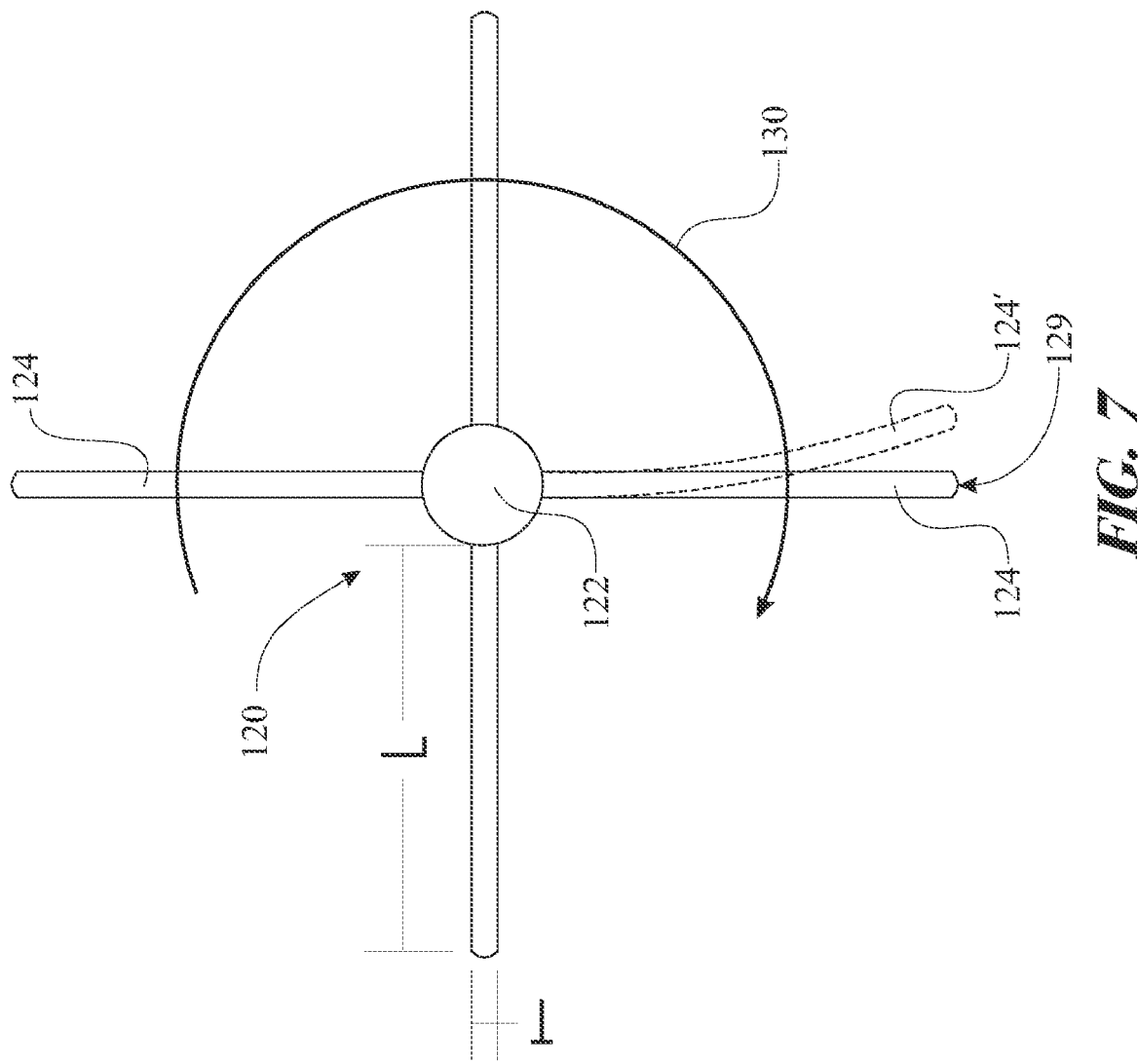
FIG. 7 presents an end view of the fish scaling blade assembly as previously presented in FIG. 5, further introducing a flexure of the blade.

Details of the scale removing blade assembly 120 are presented in FIGS. 3 through 7. The scale removing blade assembly 120 is fabricated having a blade shaft 122 having a plurality of planar blade 124 disposed thereon. The preferred embodiment is a scaling blade assembly having four (4) planar blades 124 equally spaced about the blade shaft 122. For reference, the blade shaft 122 is defined as having a coupling end 126 and a distal end 128. The coupling end 126 can incorporate features such as a plurality of flat sections 123, a tab (not shown), and any other feature which defines a non-circular cross sectional shape of the blade shaft 122, thus aiding in the transfer of the applied torque from the blade coupling member 104 to the blade shaft 122. The torque causes the scale removing blade assembly 120 to move as described via a blade rotation 130. The blades 124 are of a rubber or other flexible material providing flexure during use. The blades 124 are of a dimension allowing the blades 124 to flex when rotating and contacting the fish scales 142. Friction and the flexure increase the efficiency of the scale removal process. Additionally, the blade design allows for increased rotational speed of the apparatus 100. The planar blade 124 flexes based upon several factors: the dimensions and the material. The material is non-rigid, such as rubber, nylon, plastic, dense cardboard, and the like. The blade 124 is of a width W that is significantly greater than the thickness T proximate the coupling end 126 of the blade assembly. A preferable length to width ratio would be between 2:1 and 4:1, but can easily be as great as 10:1. The greater the width W to thickness T ratio, the more flexure of the blade 124' (FIG. 7) is achieved by geometry. The fish contacting surface is defined by a scale removing edge 129 and finished to avoid sharp edges, such as by chamfering, rounding, and the like as illustrated in FIG. 6. The contacting surface is continuous along the length L of the blade 124. The contacting surface can be linear or curved. The end of the blade 124 tapers towards the blade shaft 122 proximate the distal end 128 for safety.

Figure 8:
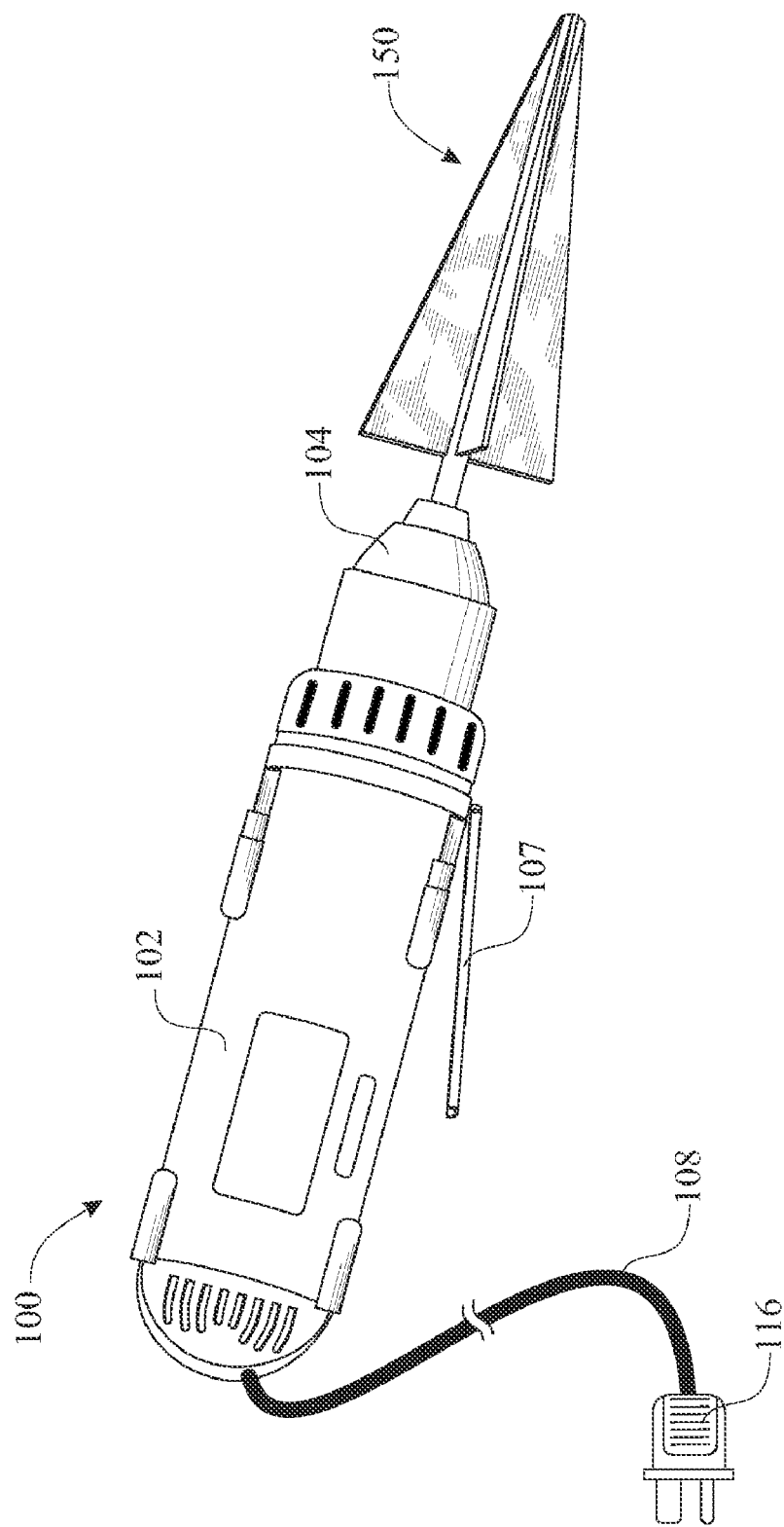
FIG. 8 presents a side view of the fish scaling apparatus having a triangular shaped blade, trigger power control, and an AC power cord.
Figure 9:
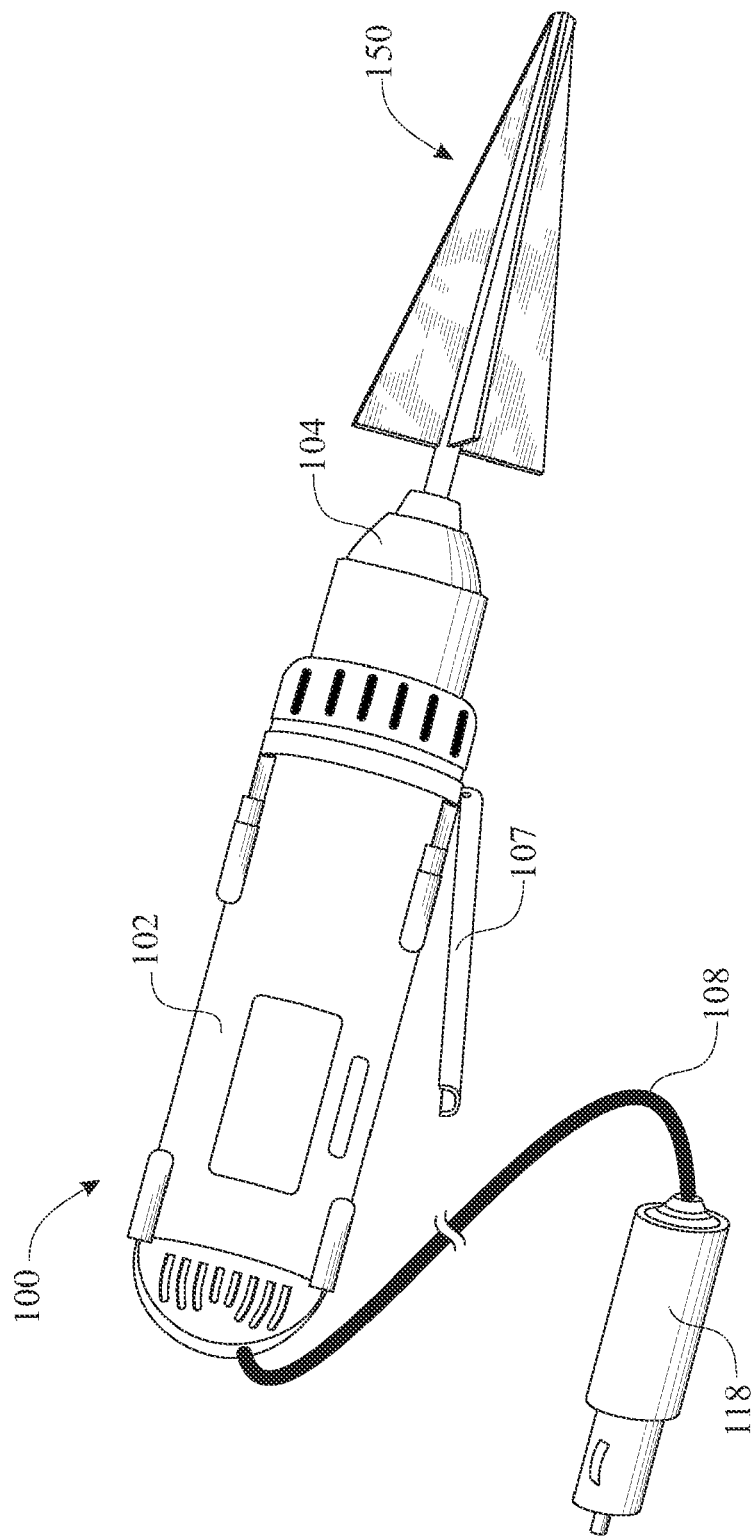
FIG. 9 presents a side view of the fish scaling apparatus similar to the apparatus presented in FIG. 8 while having a DC power cord.

The previously presented embodiments utilize batteries for power. Alternate power scenarios are presented in FIGS. 8 and 9. The fish scale removing rotary apparatus 100 can be powered by AC via an AC power connector 116 (FIG. 8) or by DC via a DC power connector 118 (FIG. 9). The plug 116, 118 is in electrical communication with rotary motor of fish scale removing rotary handpiece 102 via a power cord 108. A levered power control 107 is incorporated providing a trigger or levered style power control providing the user with a fixed (On-Off) or variable switch. The levered power control 107 requires that the operator continuously hold the switch for operation, providing an additional safety feature. The illustration presents an alternate scale removing blade assembly 150, being an alternate to the scale removing blade assembly 120 previously presented.

Figure 13:
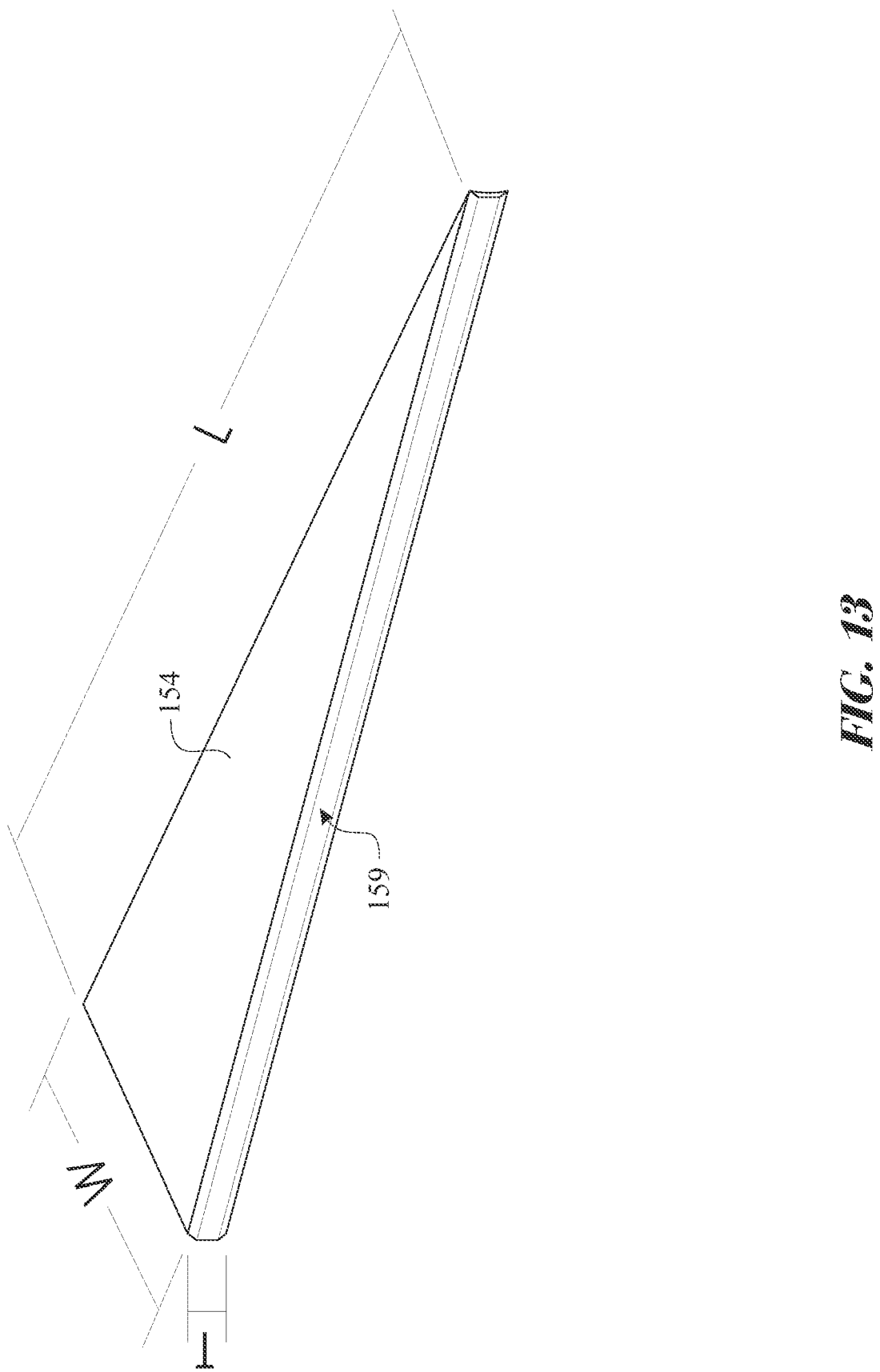
FIG. 13 presents an isometric view of an individual blade of the fish scaling blade assembly of FIG. 10.

Details of the scale removing blade assembly 150 are presented in FIGS. 10 through 13. The scale removing blade assembly 150 is fabricated having a blade shaft 152 having a plurality of blades 154 disposed thereon. The blade 154 is similar to the blade 124, whereas the blade 154 provides a triangular shape, as opposed to the polygon shape of the blade 124. For reference, the blade shaft 152 is defined as having a coupling end 156 and a distal end 158. The coupling end 156 can incorporate features such as a plurality of flat sections 153, a tab (not shown), and any other feature providing the same benefits as the torque features of the coupling end 126 previously presented. The planar blade 154 comprising the same features and dimensions as presented respective to the blade 124 previously presented. The contacting surface is defined by a scale removing edge 159 and finished to avoid sharp edges, such as by chamfering, rounding, and the like as illustrated in FIG. 13. The contacting surface is continuous along the length L of the blade 154. The contacting surface can be linear, chamfered, or curved.

Figure 17:
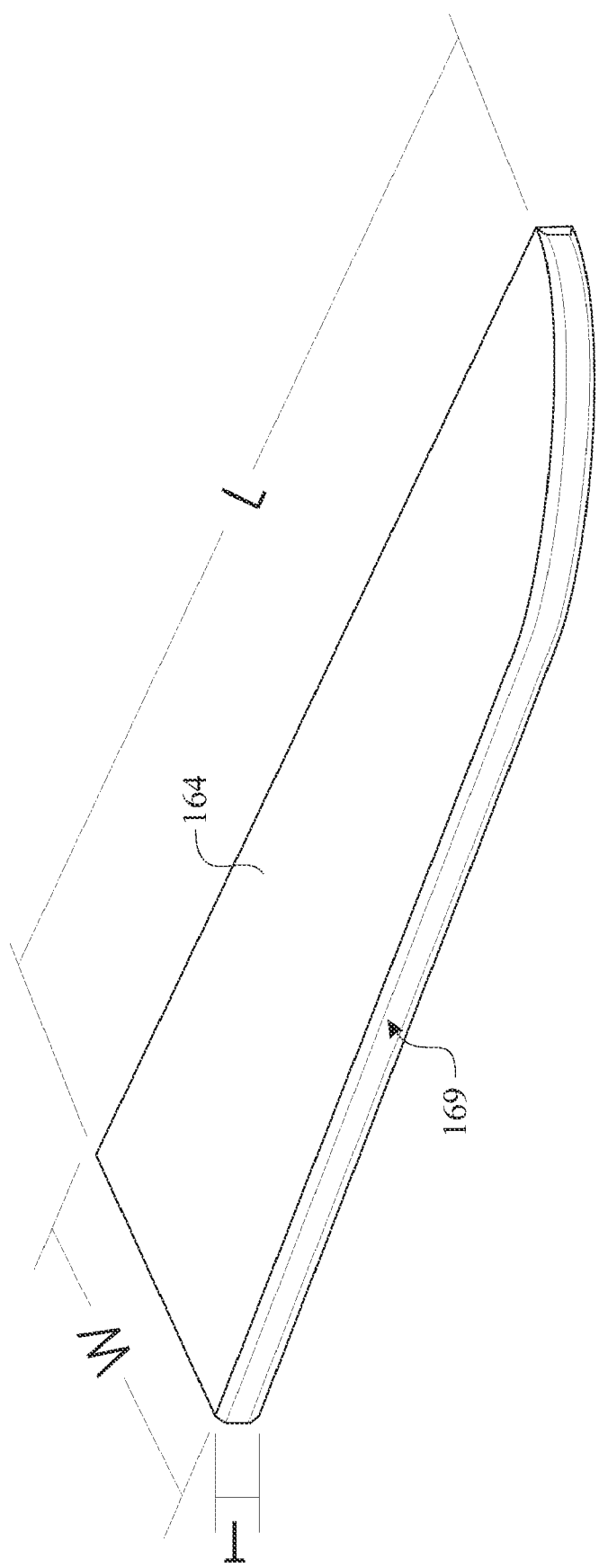
FIG. 17 presents an isometric view of an individual blade of the fish scaling blade assembly of FIG. 14.

Details of an alternate exemplary scale removing blade assembly 160 are presented in FIGS. 14 through 17. The scale removing blade assembly 160 is fabricated having a blade shaft 162 having a plurality of blades 164 disposed thereon. The blade 164 is similar to the blade 124, whereas the blade 164 provides a rectangular shape having a curved distal end, as opposed to the polygon shape of the blade 124. For reference, the blade shaft 162 is defined as having a coupling end 166 and a distal end 168. The coupling end 166 can incorporate features such as a plurality of flat sections 163, a tab (not shown), and any other feature providing the same benefits as the torque features of the coupling end 126 previously presented. The planar blade 164 comprising the same features and dimensions as presented respective to the blade 124 previously presented. The contacting surface is defined by a scale removing edge 169 and finished to avoid sharp edges, such as by chamfering, rounding, and the like as illustrated in FIG. 17. The contacting surface is continuous along the length L of the blade 164. The contacting surface can be linear, chamfered, or curved.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A fish scale removal apparatus, the fish scale removal apparatus comprising:
    a rotary motor encased in a housing;
    a blade coupling member, the blade coupling member being rotated by the motor;
    a scale removing blade assembly, the scale removing blade assembly being removably coupled to the fish scale removal apparatus via the blade coupling member; and
    the scale removing blade assembly comprising a plurality of elongated planar blades projecting transversely from a shaft,
    wherein the elongated planar blades are defined as having two vertical surfaces having a proximal edge and a distal edge, the proximal edge being proximate the shaft, spanning between a coupling portion of the shaft and a distal end of the shaft and a scale removing edge provided between the distal edges of the vertical surfaces,
    wherein the elongated planar blades are fabricated of a size, shape, and material in which the elongated planar blade flexes when the scale removing blade assembly is rotating and the scale removing edge contacts skim of a fish; and
    each blade being arranged in a parallel relation to a longitudinal axis of said shaft and projecting radially from a shaft.

2. A fish scale removal apparatus as recited in claim 1, the apparatus further comprising a speed control switch for adjusting a rotational speed of the motor.

3. A fish scale removal apparatus as recited in claim 1, the apparatus further comprising a scale removing blade shield positioned covering at least half of a length of the scale removing blade assembly.

4. A fish scale removal apparatus as recited in claim 3, wherein the scale removing blade shield is removably coupled to the rotary motor housing.

5. A fish scale removal apparatus as recited in claim 4, wherein the elongated planar blades are shaped having a scale removing edge, wherein a majority of the scale removing edge is substantially parallel to the shaft.

6. A fish scale removal apparatus as recited in claim 4, wherein the elongated planar blades are shaped having a scale removing edge, wherein a the scale removing edge at a coupling end of the shaft is located at a distance from the shaft that is larger than the respective distance at a distal end of the shaft.

7. A fish scale removal apparatus as recited in claim 1, wherein the elongated planar blades are shaped having a scale removing edge, wherein a majority of the scale removing edge is substantially parallel to the longitudinal axis of the shaft.

8. A fish scale removal apparatus as recited in claim 1, wherein the elongated planar blades are shaped having a scale removing edge, wherein a distance between the scale removing edge at a coupling end of the shaft and the longitudinal axis of the shaft is greater than a distance between the scale removing edge at a distal end of the shaft and the longitudinal axis of the shaft.

9. A fish scale removal apparatus as recited in claim 1, wherein the elongated planar blades are fabricated of a flexible material.

10. A fish scale removal apparatus as recited in claim 1, wherein the elongated planar blades are shaped having a scale removing edge, the scale removing edge is formed having an edge selected from an edge shape group comprising a linear edge, a chamfered edge, and a curved edge.

11. A fish scale removal apparatus, the fish scale removal apparatus comprising:
    a rotary motor encased in a housing;
    a blade coupling member, the blade coupling member being rotated by the motor;
    a scale removing blade assembly, the scale removing blade assembly being removably coupled to the fish scale removal apparatus via the blade coupling member; and
    the scale removing blade assembly comprising a plurality of flexible elongated planar blades projecting transversely from a shaft,
    wherein the elongated planar blades are defined as having two vertical surfaces having a proximal edge and a distal edge, the proximal edge being proximate the shaft, spanning between a coupling portion of the shaft and a distal end of the shaft and a scale removing edge provided between the distal edges of the vertical surfaces,
    wherein the elongated planar blades are fabricated of a size, shape, and material in which the elongated planar blade flexes when the scale removing blade assembly is rotating and the scale removing edge contacts skim of a fish;
    each blade being arranged in a parallel relation to a longitudinal axis of said shaft and projecting radially from a shaft; and
    the blades defined having a length defined as a distance that is parallel to the longitudinal axis and a width being a distance that is perpendicular to the longitudinal axis, the blades having a length to width ratio between 2:1 and 10:1.

12. A fish scale removal apparatus as recited in claim 11, the apparatus further comprising a speed control switch for adjusting a rotational speed of the motor.

13. A fish scale removal apparatus as recited in claim 11, the apparatus further comprising a scale removing blade shield positioned covering at least half of a length of the scale removing blade assembly.

14. A fish scale removal apparatus as recited in claim 13, wherein the scale removing blade shield is removably coupled to the rotary motor housing.

15. A fish scale removal apparatus as recited in claim 11, wherein the elongated planar blades are shaped having a scale removing edge, wherein a majority of the scale removing edge is substantially parallel to the shaft.

16. A fish scale removal apparatus as recited in claim 11, wherein the elongated planar blades are shaped having a scale removing edge, wherein a distance between the scale removing edge at a coupling end of the shaft and the longitudinal axis of the shaft is greater than a distance between the scale removing edge at a distal end of the shaft and the longitudinal axis of the shaft.

17. A fish scale removal apparatus as recited in claim 11, wherein the elongated planar blades are shaped having a scale removing edge, the scale removing edge is formed having an edge selected from an edge shape group comprising a linear edge, a chamfered edge, and a curved edge.

18. A fish scale removal apparatus, the fish scale removal apparatus comprising:
   a rotary motor encased in a housing;
   a speed control switch for adjusting a rotational speed of the motor;
   a blade coupling member, the blade coupling member being rotated by the motor;
   a scale removing blade assembly, the scale removing blade assembly being removably coupled to the fish scale removal apparatus via the blade coupling member;
   the scale removing blade assembly comprising a plurality of flexible elongated planar blades projecting transversely from a shaft,
   wherein the elongated planar blades are defined as having two vertical surfaces having a proximal edge and a distal edge, the proximal edge being proximate the shaft, spanning between a coupling portion of the shaft and a distal end of the shaft and a scale removing edge provided between the distal edges of the vertical surfaces,
   wherein the elongated planar blades are fabricated of a size, shape, and material in which the elongated planar blade flexes when the scale removing blade assembly is rotating and the scale removing edge contacts skim of a fish;
   each blade being arranged in a parallel relation to a longitudinal axis of said shaft and projecting radially from a shaft; and
   a scale removing blade shield positioned covering at least half of a length of the scale removing blade assembly being removably attached to the housing.

19. A fish scale removal apparatus as recited in claim 18, wherein the blades are defined as having a length to width ratio would be between 2:1 and 4:1.

20. A fish scale removal apparatus as recited in claim 18, wherein the elongated planar blades are shaped having a scale removing edge, the scale removing edge is formed having an edge selected from an edge shape group comprising a linear edge, a chamfered edge, and a curved edge.

* * * * *